US008065913B2

United States Patent
McCracken et al.

(10) Patent No.: US 8,065,913 B2
(45) Date of Patent: Nov. 29, 2011

(54) INK LEVEL SENSOR

(75) Inventors: Ivan Andrew McCracken, Portland, OR (US); William Bruce Weaver, Canby, OR (US)

(73) Assignee: Xerox Corporation, Norwalk, CT (US)

( * ) Notice: Subject to any disclaimer, the term of this patent is extended or adjusted under 35 U.S.C. 154(b) by 456 days.

(21) Appl. No.: 12/241,626

(22) Filed: Sep. 30, 2008

(65) Prior Publication Data

US 2010/0077855 A1   Apr. 1, 2010

(51) Int. Cl.
    *G01F 23/24* (2006.01)
(52) U.S. Cl. ..................................... 73/304 R
(58) Field of Classification Search ................. 73/304 R
    See application file for complete search history.

(56) References Cited

U.S. PATENT DOCUMENTS

| | | | |
|---|---|---|---|
| 6,000,845 A * | 12/1999 | Tymkewicz et al. | 374/155 |
| 6,494,553 B1 | 12/2002 | Donahue et al. | |
| 6,575,096 B1 | 6/2003 | Caruthers et al. | |
| 2007/0076023 A1 | 4/2007 | Knierim et al. | |

\* cited by examiner

*Primary Examiner* — Hezron E Williams
*Assistant Examiner* — Paul West
(74) *Attorney, Agent, or Firm* — Maginot Moore & Beck LLP

(57) ABSTRACT

A probe assembly for use with an ink reservoir level sensing apparatus comprises an insulating support frame formed of an electrically insulating material. The insulating support frame includes a lower portion to be positioned in a lower portion of an ink reservoir and an upper portion configured to be positioned in an upper portion of the ink reservoir. The insulating support frame has a lower probe and an upper probe each partially encapsulated by the electrically insulating material of the insulating support frame such that the lower and upper probes are physically and electrically isolated from each other, and positioned with respect to each other such that at least a portion of the lower probe is positioned in the lower portion of the frame, and the upper probe is positioned above the lower probe in the support frame extending to the upper portion of the frame. An outer probe is attached to the insulating support frame using attachment features that are formed integrally with the insulating support frame. The outer probe is positioned on the insulating support frame extending from the lower portion of the frame to the upper portion of the insulating support frame.

20 Claims, 17 Drawing Sheets

INK LEVEL SENSOR

TECHNICAL FIELD

This disclosure relates generally to phase change ink printers, and in particular, to ink reservoirs for maintaining a supply of phase change ink in liquid form for delivery to one or more printheads of the phase change ink printers.

BACKGROUND

Several methods are currently used to determine the height of ink in the ink supply reservoirs in printers such as solid ink jet printers. The word "printer" as used herein encompasses any apparatus, such as digital copier, bookmaking machine, facsimile machine, multi-function machine, etc. which performs a print outputting function for any purpose. Examples of the methods include: (1) conductive level sense probe; (2) over-driven thermistor; and (3) vibrating beam.

The conductive level sense probe involves a single-point method of determining if the reservoir is full. When the height of the ink rises to a level touching the probe, an electrical current can pass from the probe through the ink to ground, thereby registering that the ink is at the height of the probe tip.

The over-driven thermistor also involves a single-point method of determining ink height. When the thermistor is covered by ink, the thermistor is quenched to a lower temperature. This causes the thermistor to send a different resistance reading to a controller indicating that the ink is at the height of the thermistor.

The vibrating beam or "twanger" is a form of continuous ink level sensing. The resonance of the beam changes as a function of the amount of the beam immersed in ink (i.e., the ink level).

SUMMARY

An ink level sensing probe has been developed that enables a continuous measurement of the ink level in an ink reservoir. In one embodiment, a probe assembly for use with an ink reservoir level sensing apparatus comprises an insulating support frame formed of an electrically insulating material. The insulating support frame includes a lower portion to be positioned in a lower portion of an ink reservoir and an upper portion configured to be positioned in an upper portion of the ink reservoir. The insulating support frame has a lower probe and an upper probe each partially encapsulated by the electrically insulating material of the insulating support frame such that the lower and upper probes are physically and electrically isolated from each other, and positioned with respect to each other such that at least a portion of the lower probe is positioned in the lower portion of the frame, and the upper probe is positioned above the lower probe in the support frame extending to the upper portion of the frame. An outer probe is attached to the insulating support frame using attachment features that are formed integrally with the insulating support frame. The outer probe is positioned on the insulating support frame extending from the lower portion of the frame to the upper portion of the insulating support frame.

In another embodiment, an ink reservoir level sensing system is provided that comprises at least one probe assembly configured to be inserted into an ink reservoir of an imaging device. The at least one probe assembly includes an insulating support frame formed of an electrically insulating material. The insulating support frame includes a lower portion to be positioned in a lower portion of an ink reservoir and an upper portion configured to be positioned in an upper portion of the ink reservoir. The insulating support frame includes a lower probe and an upper probe each partially encapsulated by the electrically insulating material of the insulating support frame such that the lower and upper probes are physically and electrically isolated from each other, and positioned with respect to each other such that at least a portion of the lower probe is positioned in the lower portion of the frame, and the upper probe is positioned above the lower probe in the support frame extending to the upper portion of the frame. An outer probe is attached to the insulating support frame using attachment features that are formed integrally with the insulating support frame. The outer probe is positioned on the insulating support frame extending from the lower portion of the frame to the upper portion of the insulating support frame. The system includes a controller configured to drive an AC signal to the outer probe and to detect a current flow from the outer probe to the upper and lower probes via ink in the reservoir.

In yet another embodiment, a system for use with an imaging device comprises at least one ink reservoir configured to hold a supply of ink; and a probe assembly configured to be inserted into the at least one ink reservoir. The probe assembly includes an insulating support frame formed of an electrically insulating material. The insulating support frame includes a lower portion to be positioned in a lower portion of an ink reservoir and an upper portion configured to be positioned in an upper portion of the ink reservoir. The insulating support frame includes a lower probe and an upper probe each partially encapsulated by the electrically insulating material of the insulating support frame such that the lower and upper probes are physically and electrically isolated from each other, and positioned with respect to each other such that at least a portion of the lower probe is positioned in the lower portion of the frame, and the upper probe is positioned above the lower probe in the support frame extending to the upper portion of the frame. The system includes an outer probe attached to the insulating support frame using attachment features that are formed integrally with the insulating support frame. The outer probe is positioned on the insulating support frame extending from the lower portion of the frame to the upper portion of the insulating support frame. The system includes a controller configured to drive an AC signal to the outer probe and to detect a current flow from the outer probe to the upper and lower probes via ink in the reservoir.

DETAILED DESCRIPTION OF THE PREFERRED EMBODIMENT

Figure 1:
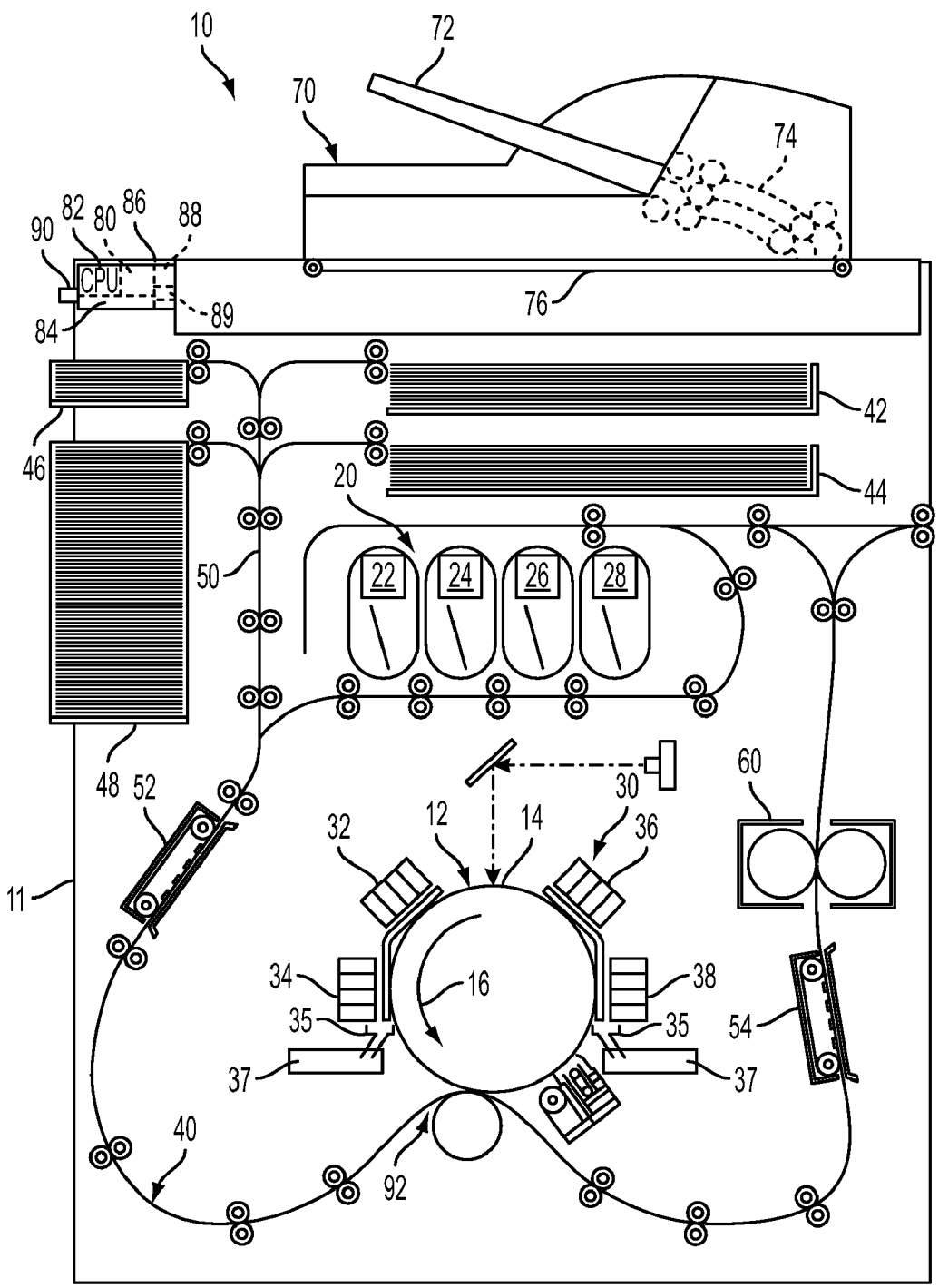
FIG. 1 is block diagram of a phase change ink image producing machine.

For a general understanding of the system disclosed herein as well as the details for the system and method, reference is made to the drawings. In the drawings, like reference numerals have been used throughout to designate like elements. As used herein, the word "printer," "imaging device," "image producing matching," etc. encompasses any apparatus that performs a print outputting function for any purpose, such as a digital copier, bookmaking machine, facsimile machine, a multi-function machine, etc.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink system 20 that has at least one source 22 of one color phase change ink in solid form. Since the phase change ink image producing machine or printer 10 is a multicolor image producing machine, the ink system 20 includes for example four (4) sources 22, 24, 26, 28, representing four (4) different colors CYMK (cyan, yellow, magenta, black) of phase change inks. The phase change ink system 20 also includes a phase change ink melting and control assembly 100 (FIG. 2), for melting or phase changing the solid form of the phase change ink into a liquid form. Thereafter, the phase change ink melting and control assembly 100 then controls and supplies the molten liquid form of the ink towards a printhead system 30 including at least one printhead assembly 32. Since the phase change ink image producing machine or printer 10 is a high-speed, or high throughput, multicolor image producing machine, the printhead system includes for example four (4) separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Figure 2:
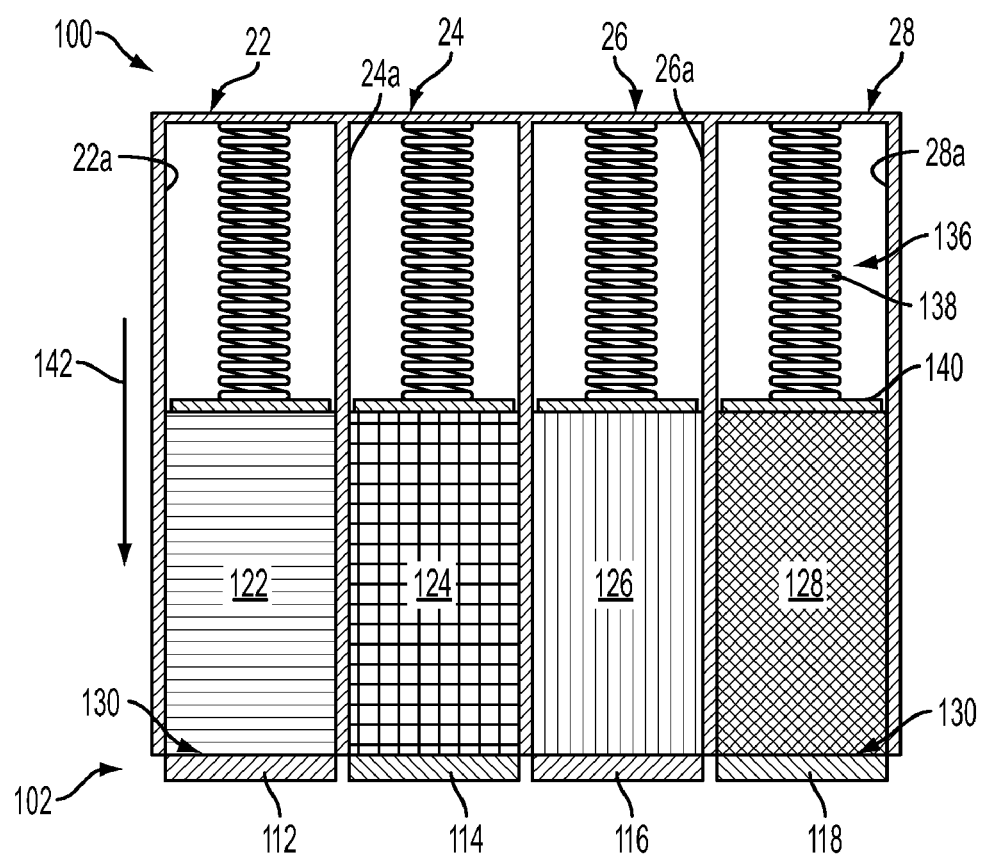
FIG. 2 is top view of four ink sources and a melter assembly having four melter plates of the phase change ink image producing machine of FIG. 1.
Figure 3:
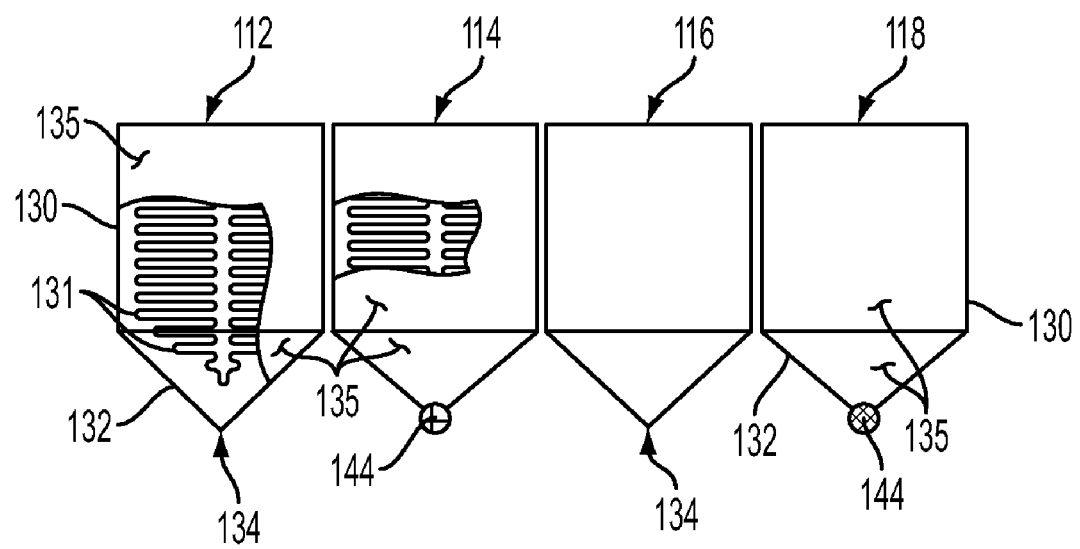
FIG. 3 is front side view of the four melter plates of the melter assembly.

Referring now to FIGS. 2 and 3, there is shown the ink delivery system 100. The ink delivery system 100 of the present example includes four ink sources 22, 24, 26, 28, each holding a different phase change ink in solid form, such as for example inks of different colors. However, the ink delivery system 100 may include any suitable number of ink sources, each capable of holding a different phase change ink in solid form. The different solid inks are referred to herein by their colors as CYMK, including cyan 122, yellow 124, magenta 126, and black 128. Each ink source can include a housing (not shown) for storing each solid ink separately from the others. The solid inks are typically in block form, though the solid phase change ink may be in other formats, including but not limited to, pellets and granules, among others.

The ink delivery system 100 includes a melter assembly, shown generally at 102. The melter assembly 102 includes a melter, such as a melter plate, connected to the ink source for melting the solid phase change ink into the liquid phase. In the example provided herein, the melter assembly 102 includes four melter plates, 112, 114, 116, 118 each corresponding to a separate ink source 22, 24, 26 and 28 respectively, and connected thereto. As shown in FIG. 3, each melter plate 112, 114, 116, 118 includes an ink contact portion 130 and a drip point portion 132 extending below the ink contact portion and terminating in a drip point 134 at the lowest end. The drip point portion 132 can be a narrowing portion terminating in the drip point.

The melter plates 112, 114, 116, 118 can be formed of a thermally conductive material, such as metal, among others, that is heated in a known manner. In one embodiment, solid phase change ink is heated to about 100° C. to 140° C. to melt the phase change ink to liquid form for supplying to the liquid ink storage and supply assembly 400. As each color ink melts, the ink adheres to its corresponding melter plate 112, 114, 116 118, and gravity moves the liquid ink down to the drip point 134 which is disposed lower than the contact portion. The liquid phase change ink then drips from the drip point 134 in drops shown at 144. The melted ink from the melters may be directed gravitationally or by other means to the ink storage and supply assembly 400.

Figure 4:
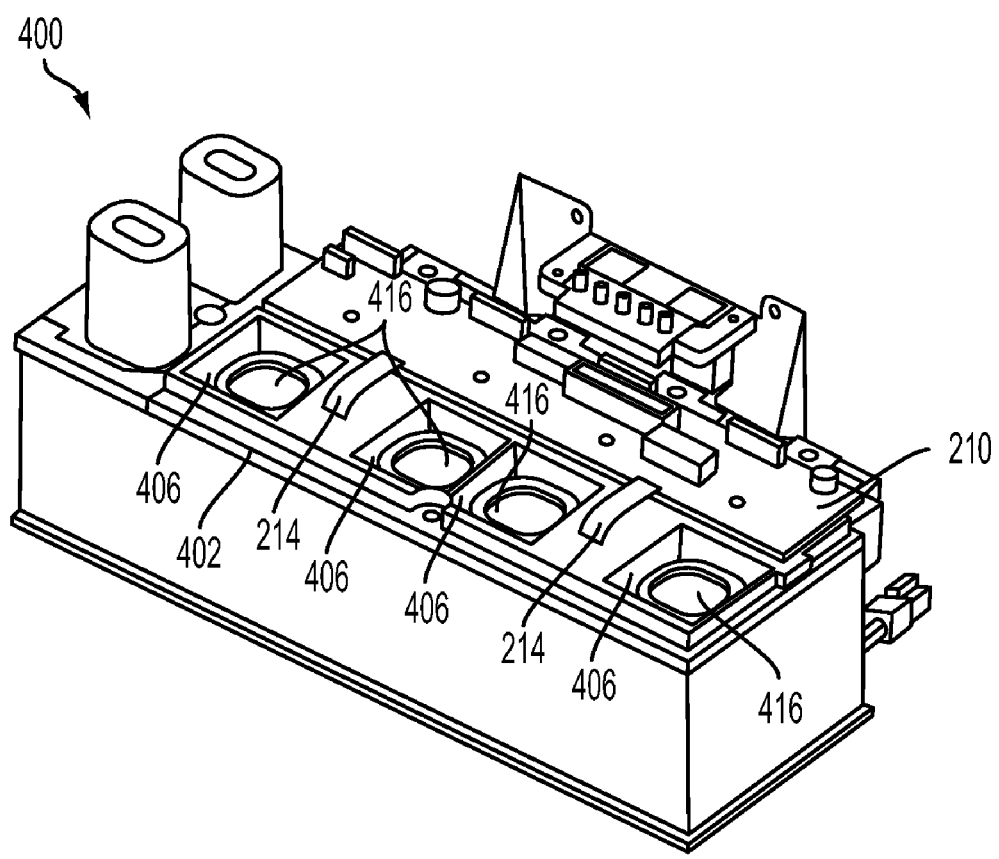
FIG. 4 is a perspective view of an ink storage and supply assembly.
Figure 5:
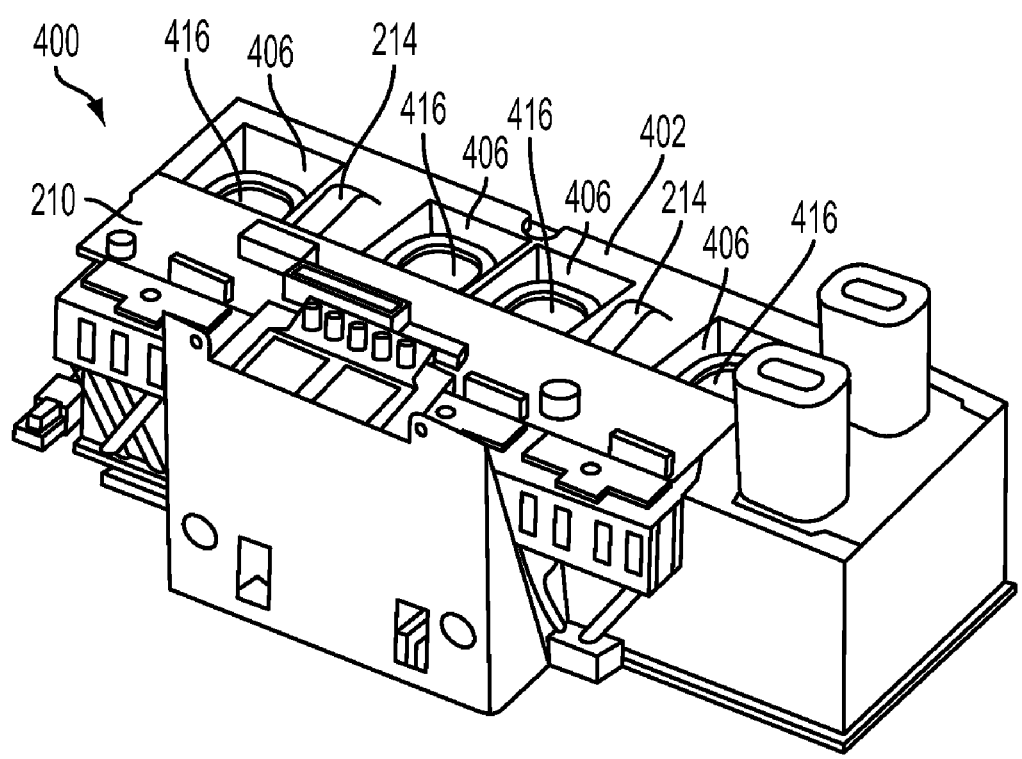
FIG. 5 is another perspective view of the ink storage and supply assembly of FIG. 4.

FIGS. 4 and 5 show front and back perspective views of an embodiment of an ink storage and supply system 400. In the embodiment of FIGS. 4 and 5, the ink storage and supply system 400 includes an ink collector 402 positioned above the primary reservoirs (not shown in FIGS. 4 and 5) of the ink storage and supply system 400. The ink collector 402 includes an opening 406 positioned above each reservoir of the ink storage and supply system 400 that is configured to collect the molten ink as it drips from an ink melter and to direct or funnel the ink into a corresponding reservoir. In some embodiments, the ink collector may also include filters 416 positioned in each opening 406 of the collector that are configured to filter or remove gross contaminants from the ink before the ink enters the reservoirs.

Figure 6:
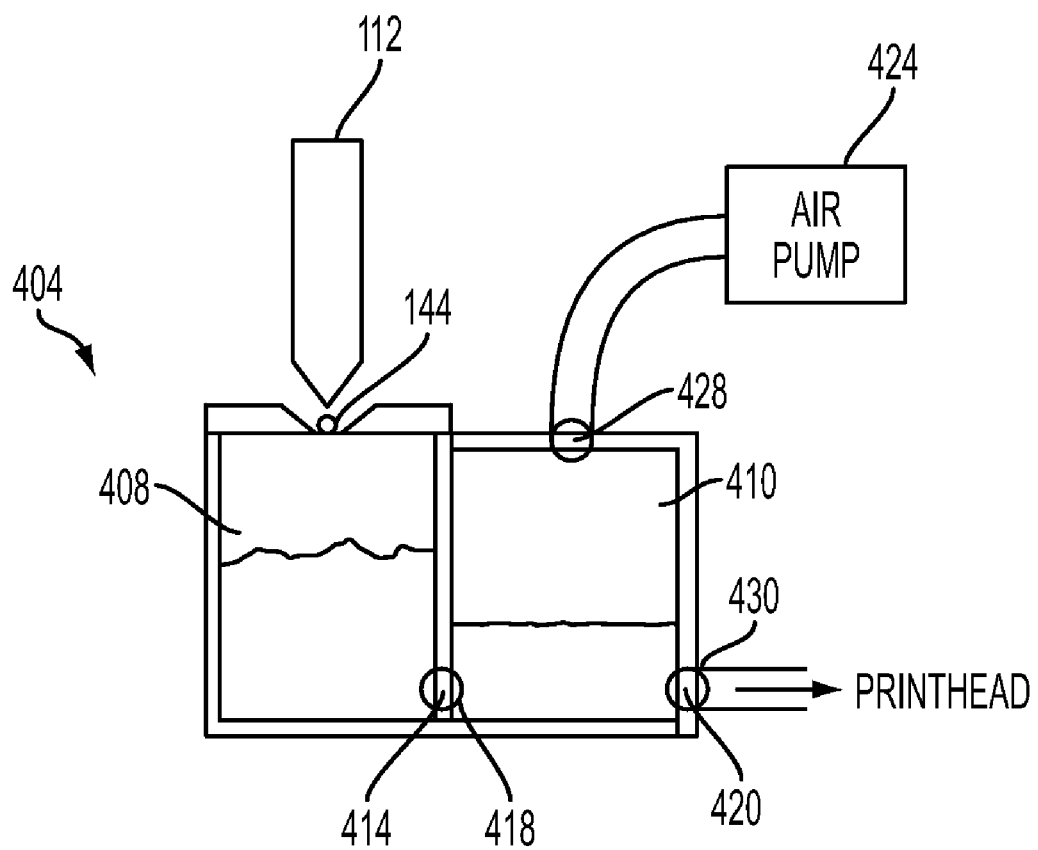
FIG. 6 is a side cross-sectional view of a dual reservoir of the ink melting and control assembly.

In one embodiment, the ink storage and supply system 400 may incorporate a dual reservoir system. FIG. 6 shows a simplified side cross-sectional view of the ink storage and supply system showing an exemplary embodiment of a dual reservoir. In this embodiment, each reservoir 404 of the ink storage and control assembly 400 includes a primary reservoir 408 and a secondary reservoir 410 for each ink source and corresponding ink melter of the ink delivery system. Only one dual reservoir is shown in FIG. 6, but each reservoir 404 of the ink storage and control assembly 400 may be configured as a dual reservoir as depicted in FIG. 6. In the embodiment of FIG. 6, each primary reservoir 408 comprises a low pressure reservoir (LPR) configured to receive molten ink from a corresponding ink melt plate (for example, melt plate 112) of the ink delivery system. Each LPR 408 includes an opening 414 at or near a bottom portion of the LPR 408 through which ink may flow to a corresponding secondary reservoir 410. Gravity, or liquid ink height, may serve as the driving force for causing the molten ink to exit a respective LPR 408 through the opening and into the corresponding secondary reservoir 410. To prevent backflow of ink from a secondary reservoir 410 to the corresponding primary reservoir (LPR) 408, the openings 414 in the LPR's may be provided with one-way check valves 418 that permit ink to flow gravitationally from the LPR 408 into the secondary reservoir 410.

The secondary reservoirs 410 comprise high pressure reservoirs (HPR). Each HPR 410 includes at least one discharge outlet 420 through which molten ink may flow to an ink routing assembly (not shown) for directing ink to one or more printheads (not shown) of the printhead assembly. Each HPR may include a plurality of discharge outlets 420 for supplying ink to a plurality of printheads. For example, in a system that includes four printheads for each color of ink, each HPR may include four discharge outlets, each outlet being configured to supply ink to a different printhead. When charging a printhead with ink, pressure is applied to the ink in a corresponding HPR using, for example, an air pump 424 through a dosing valve 428 or other suitable pressurization means to causing the ink to discharge through the one or more discharge outlets 420 of the HPR. The discharge outlet(s) of the HPR may include check valve(s) 430 or other suitable backflow prevention means that are configured to open to permit the flow of molten ink from the secondary reservoir to the printhead when the HPR is pressurized while preventing backflow of the ink through the opening 420 back into the HPR 410. In addition, the valve 418 in the opening 414 is configured to prevent backflow of ink from the secondary reservoir to the primary reservoir when the secondary reservoir is pressurized.

Figure 7:
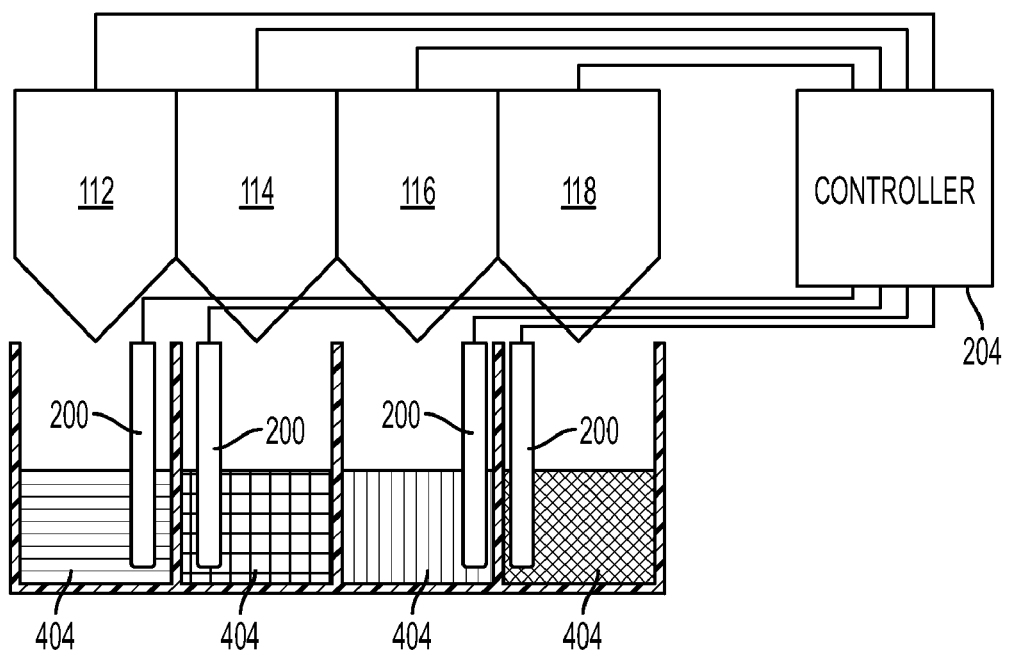
FIG. 7 is a front cross-sectional view of an ink level sensing system.

In order to prevent the ink storage and supply assembly 400 of the imaging device from exhausting the available supply of ink, the reservoirs 404 of the ink storage and supply assembly 400 may be provided with ink level sensors 200. FIG. 7 shows a schematic diagram an exemplary reservoir ink level sensing system for use with the ink storage and supply system 400. As depicted in FIG. 7, the ink level sensing system includes an ink level sensor 200 positioned in each reservoir 404 of the ink storage and supply system 400 and an ink level controller 204. The level sensors 200 are configured to generate one or more signals indicative of the ink level in the corresponding ink reservoir. The ink level controller 204 is configured to receive the signals indicative of the ink levels in each of the reservoirs.

During operation, the ink level controller 204 is configured to maintain a substantially consistent amount of melted ink in the reservoirs available for delivery to the printheads. Accordingly, during operations, the controller 204 is configured to monitor the ink level sensors 200 to determine when the ink level of a reservoir reaches one or more predetermined threshold levels. For example, when a level sensor 200 indicates that the ink level in a reservoir has fallen below a "start fill" level, the controller is configured to signal the corresponding ink melter 112, 114, 116, 118 to begin melting and supplying ink to the ink reservoir. The controller 204 is configured to monitor the ink level sensor in the reservoir as the melted ink is being supplied to the reservoir to determine when a "stop fill" level is reached at which point the controller is configured to signal the appropriate melter to stop supplying ink to the reservoir. Detecting an ink supply deficiency, melting the solid ink in response to the deficiency, and refilling the reservoir to a supply level with the melted ink may be referred to as an "ink melt duty cycle." In addition to the start fill and stop fill levels, the controller is configured to monitor the ink levels as the reservoir is being filled to determine when a "last dose" level is reached at which point the controller may pause operations until the reservoir has been replenished. The last dose level corresponds to the level of ink at which continued printing operations run the risk of running the reservoir dry.

In previously known systems, start fill, stop fill, and last dose ink levels corresponded to electrode positions in an ink reservoir. For example, electrodes were positioned at designated heights in the reservoir corresponding to predetermined start fill, stop fill, and last dose ink levels. During operation of such a system, as an electrode is covered or uncovered with ink, the signal output by the electrode changes thus indicating that the ink the reservoir has reached a level corresponding to the position of the particular electrode in the reservoir. Therefore, previously known ink level sensors were typically capable of determining the ink level in a reservoir at a limited number of discrete points, i.e., electrode positions, in the reservoir. Adding more electrodes arrayed across the height of the reservoir was the only way to sense the ink level at varying heights.

Contrary to previously known ink level sensing methods, the ink level sensors 200 of the present embodiment are configured to measure the level of ink in each of the reservoirs 404 in a substantially continuous manner. As explained in more detail below, the ink level sensors of the present disclosure are configured to sense or detect the height of ink in a reservoir by detecting or measuring a base line conductivity of the ink present in the reservoir with a lower probe 248, shown in FIGS. 12-15, positioned in a lower portion of a reservoir. An upper probe 246, also shown in FIGS. 12-15, extends upward from the lower probe 248 in the reservoir and is configured to detect or measure the conductivity of the ink in the reservoir as the ink height changes and the upper probe 246 becomes covered or uncovered by ink. The ink level in a reservoir is determined by comparing the base line conductance of the ink in a reservoir indicated by the lower probe 246 to the varying conductance of the ink in the reservoir indicated by the upper probe 248.

Figure 8:
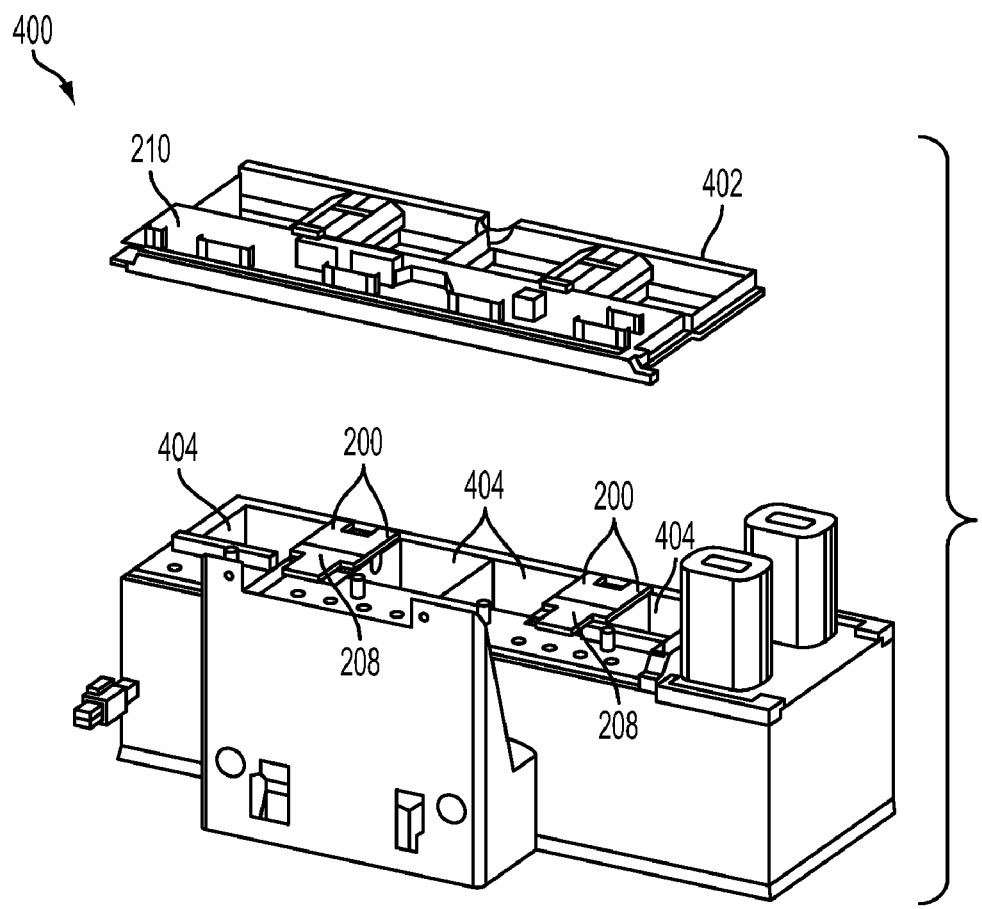
FIG. 8 is a perspective view of the ink storage and supply assembly with the cover removed showing the ink level sensors in the reservoirs.
Figure 9:
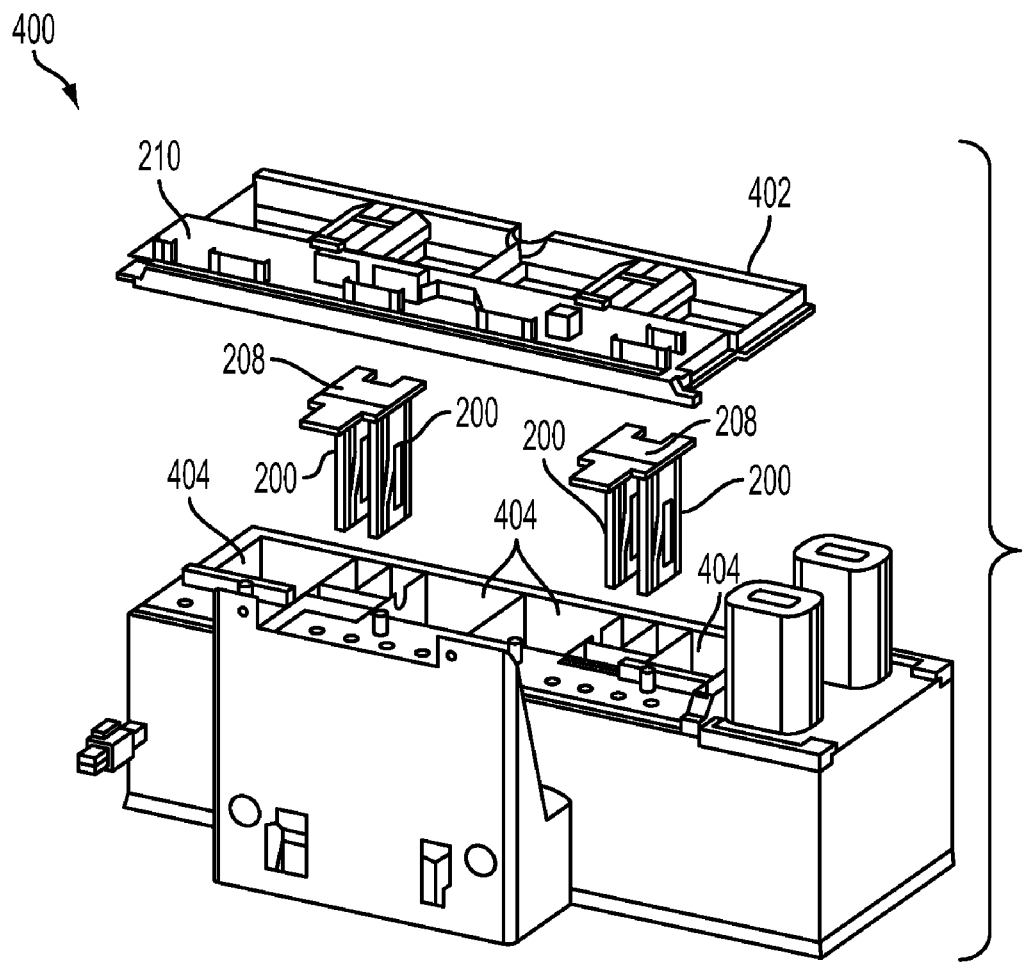
FIG. 9 is a perspective view of the ink storage and supply assembly with the cover removed showing the ink level sensors out of the reservoirs.
Figure 10:
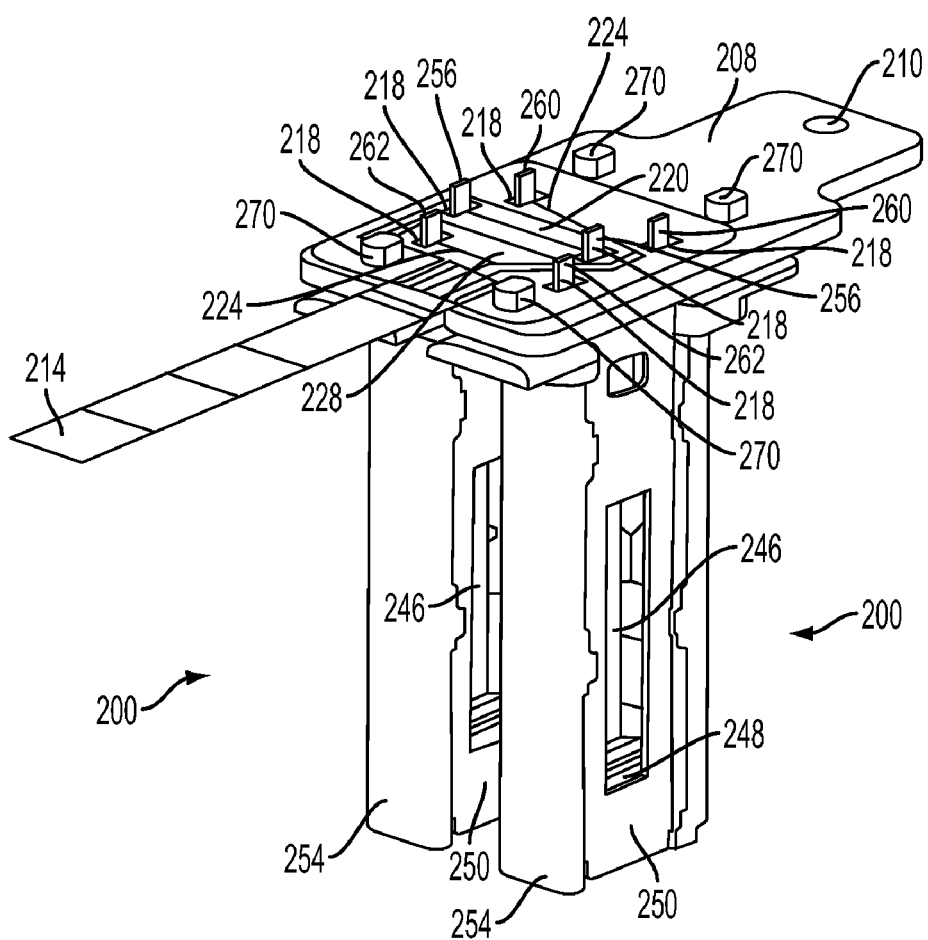
FIG. 10 is a perspective view of a pair of level sensors and the corresponding sensor support and flex tape.
Figure 11:
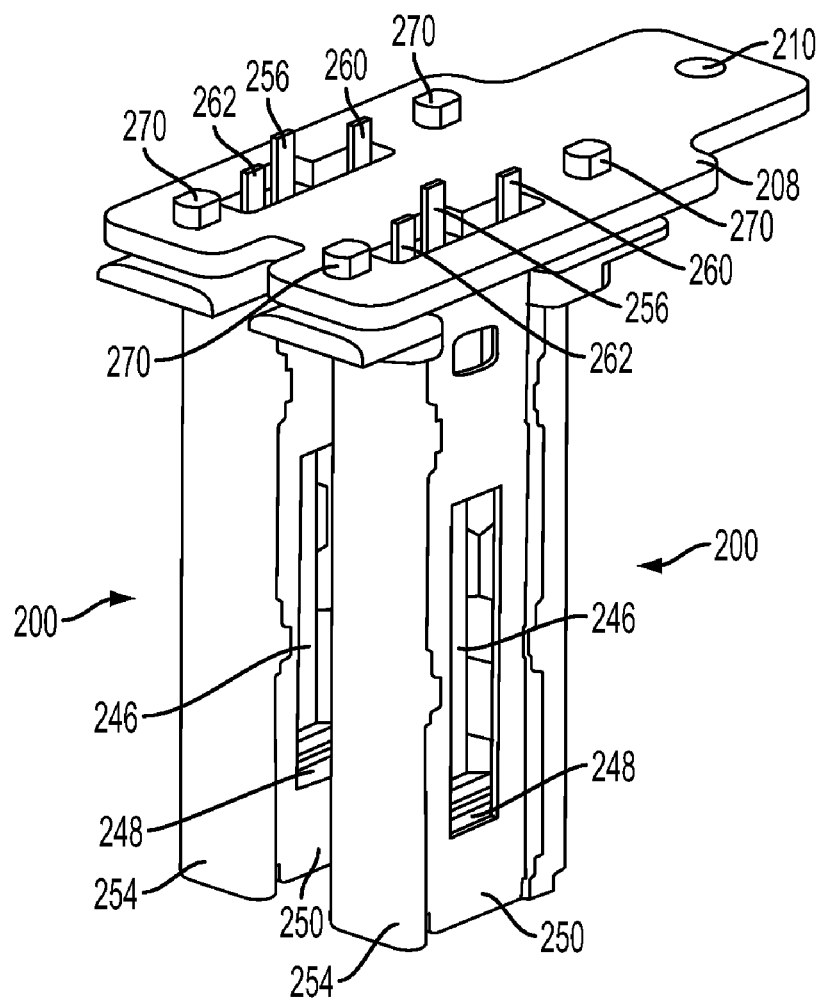
FIG. 11 is a perspective view of the pair of level sensors of FIG. 10 without the flex tape.

FIGS. 8 and 9 show the ink storage and supply system 400 with the ink collector/filter housing removed showing the reservoirs 404 and corresponding ink level sensors 200 of the present disclosure. In particular, FIG. 8 shows the ink level sensors 200 positioned in each of the reservoirs 404 of the ink storage and supply system 400, and FIG. 9 shows the ink level sensors 200 removed from the corresponding reservoirs 404 for clarity. In the dual reservoir system of FIG. 6, ink level sensors 200 may be provided in the primary reservoirs 408 of the ink storage and supply system 400.

Level sensor positioning support members 208 are operably connected to the level sensors 200 and the ink storage and supply system 400 to locate or position the level sensors in their respective reservoirs 404. As depicted in FIGS. 8-11, a single support member 208 may be used to support two level sensors 200 in adjacent reservoirs (for a total of two support members in the exemplary embodiment). A separate support member, however, may be provided for each level sensor. The support members 208 may be formed of any suitable material capable of supporting the level sensors, such as plastic, and may include features that enable the support members to be secured, fixedly or removably, to ink storage and supply system. For example, the support members may include fastener openings 210 that are configured to receive a fastener, such as a screw or bolt, therethrough and into a corresponding fastener opening (not shown) in the ink storage and supply system. The support members also include appropriate features (explained below) that enable the level sensors to be secured, fixedly or removably, to the support members.

Referring now to FIGS. 12-15, there is shown an embodiment of a level sensor 200. The level sensor 200 includes a body that is configured for insertion into an ink reservoir so that a bottom or lower portion of the sensor is at or near a bottom of the reservoir with the top portion of the sensor at or above the top of the reservoir. The level sensor of FIGS. 12-15 includes a lower probe 248, an upper probe 246, and an outer probe 250 that are supported by an insulating probe support frame 254. The insulating probe support 254 is configured to fixedly position the lower probe 248, upper probe 246, and outer probe 250 relative to each other to ensure that the lower probe, upper probe, and outer probe are physically and electrically isolated from each other. As used herein, a 'probe' shall be defined as any passive or active circuit element or combination of elements that emits or causes there to be emitted a recognizable signal when the probe is in contact with, or otherwise detects the presence of, a liquid. Such probes may rely on optical effects, changes in conductivity, changes in temperature, or any other physical manifestation of the presence of a liquid.

Figure 12:
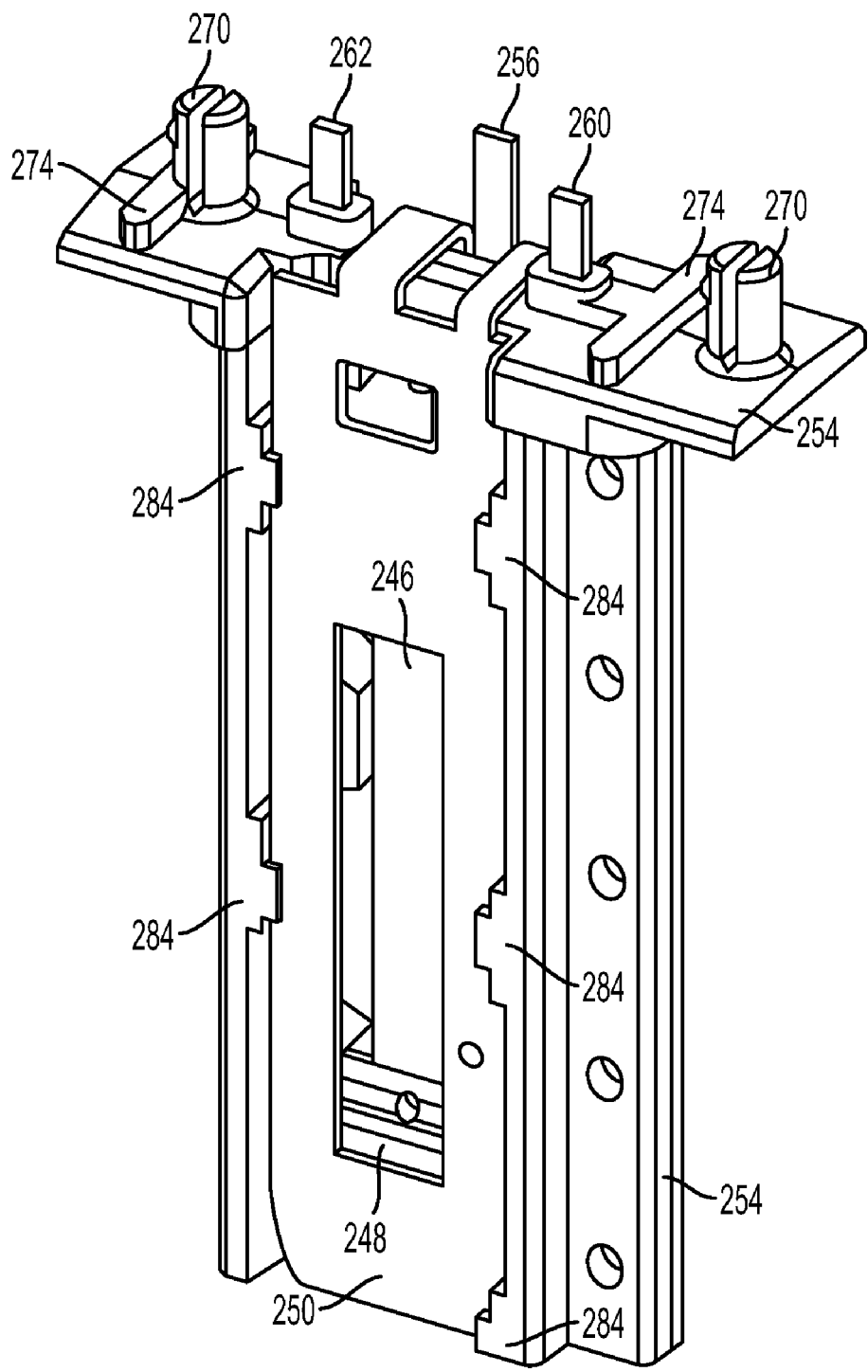
FIG. 12 is a perspective view of a level sensor.
Figure 13:
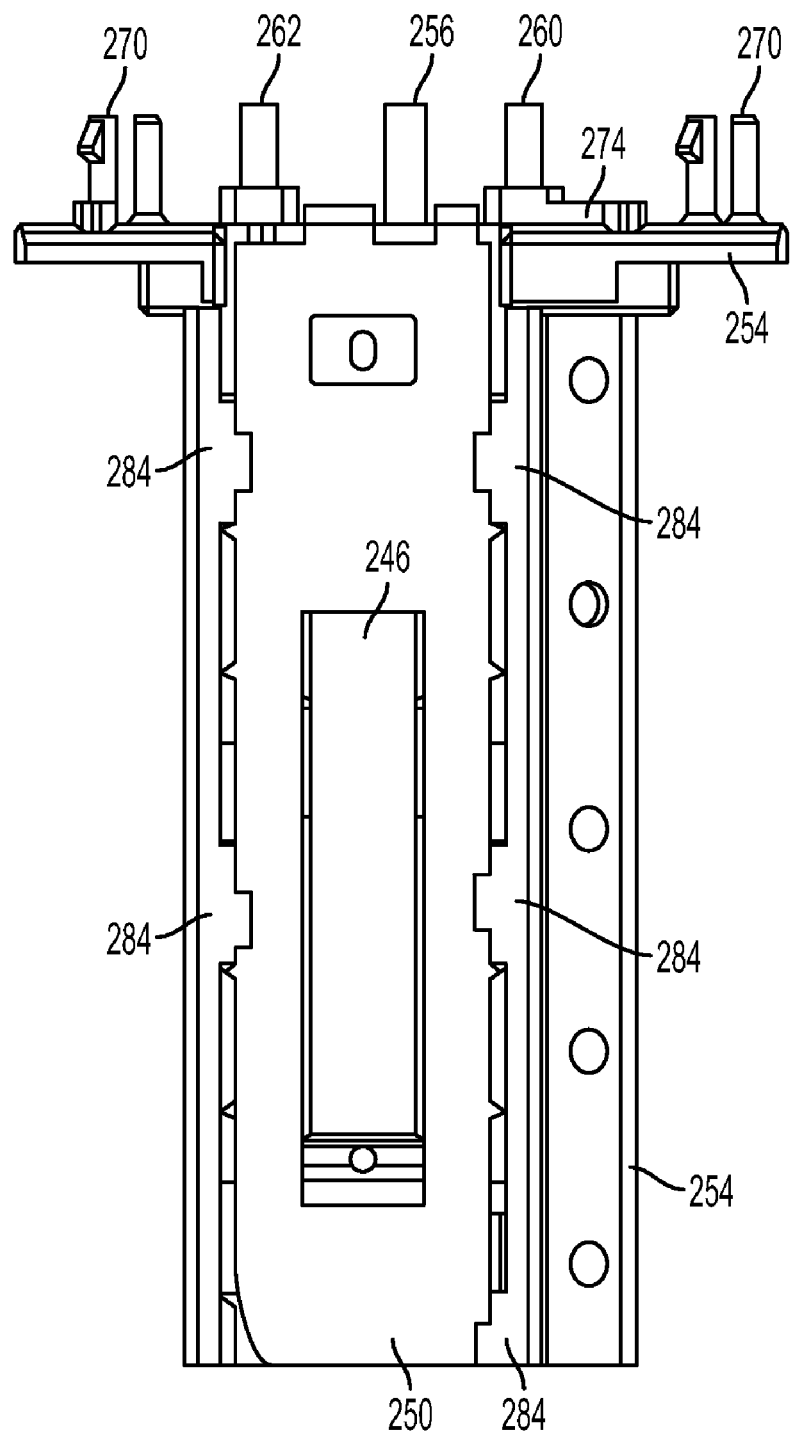
FIG. 13 is a front elevational view of the level sensor of FIG. 12.
Figure 14:
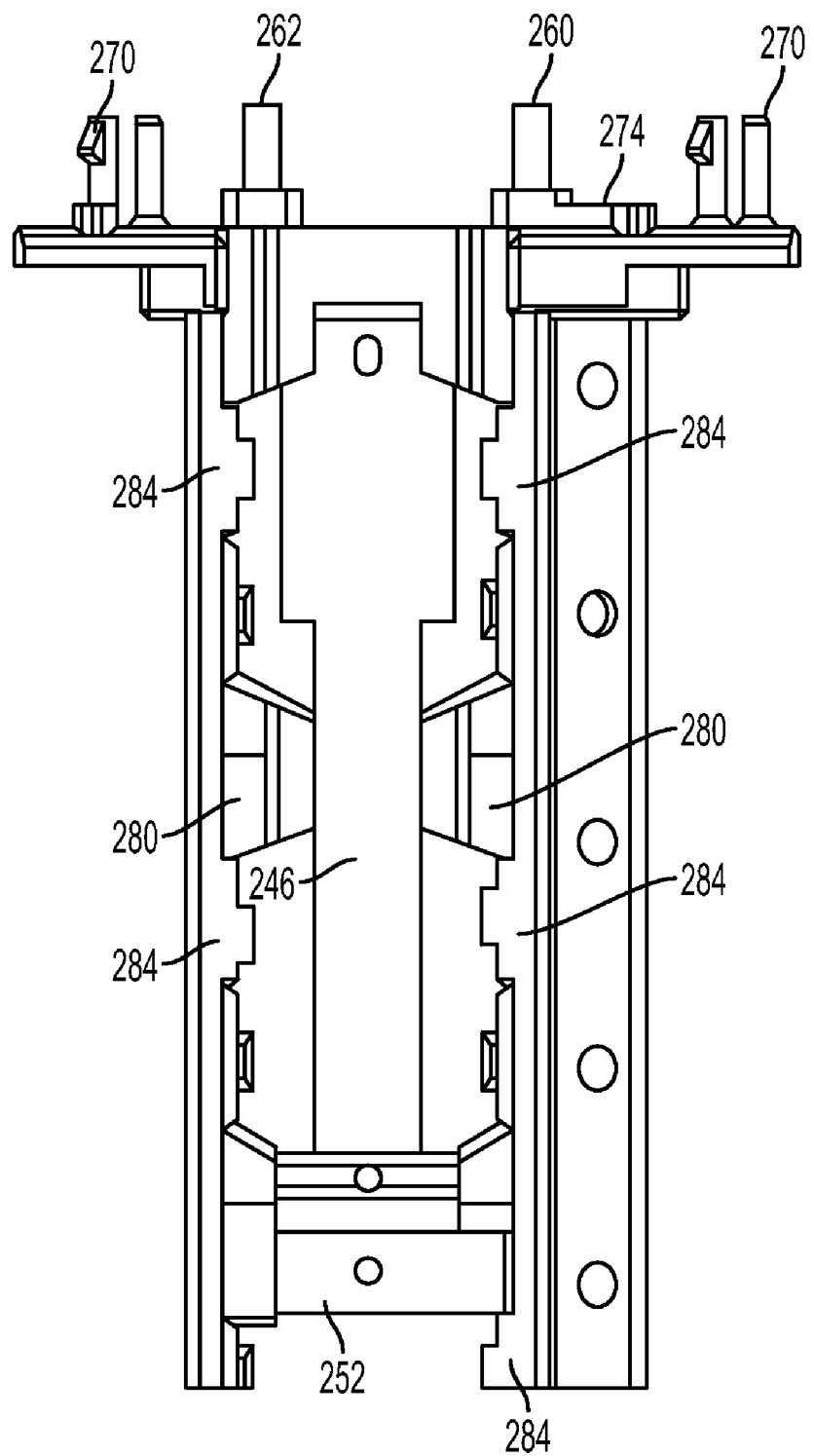
FIG. 14 is a front elevational view of the level sensor of FIG. 12 with the outer probe removed.

The probe support 254 may be formed of any suitable material that is capable of providing the desired electrically isolating properties, such as a plastic material. As shown in FIGS. 12-14, the support frame 254 may include attachment features that facilitate attachment of the level sensors 200 to the sensor supports 208 that connect the sensors to the reservoirs. For example, in the embodiment of FIGS. 12-14, the probe support 254 includes connection studs 270 and standoffs 274 that enable the level sensors to be fixedly or removably secured to the support member and precisely positioned with respect to the support member so that the tabs 260, 262, 256 of the probes may extend through openings in the support members for connection to a signal transmitting/receiving member.

As explained in more detail below, in order to simplify the construction of the probe assembly, the lower 248 and upper probe 246 of each level sensor 200 may be made integral with the support frame by positioning the lower and upper probes in predetermined positions with respect to each other in a molding tool having the desired final shape of the insulating support frame and over molding the lower and upper probes in the molding tool with a suitable insulating material such as plastic. The support frame may be molded with suitable features that enable the outer probe to be assembled to the molded frame without using adhesive or additional parts. For example, the probe support frame 254 may include standoffs 280 (best seen in FIG. 14) and opposing tabs 284 that define a slot in the direction of insertion that is configured to receive the outer probe 250 and to position the outer probe 250 with respect to the upper 246 and lower probes 248 to provide a predetermined gap therebetween. The standoffs 280 and opposing tabs 284 may be offset as depicted in FIG. 14 to allow for molding in an injection molding machine.

The gap between the outer probe 250 and the upper 246 and lower probes 248 may be any suitable distance that allows the ink to flow freely between the probes while maximizing signal transmission through the ink from the outer probe to the upper and lower probes. A gap that is too small between the outer probe and the upper and lower probes may cause the ink to move sluggishly between the probes, due to surface tension effects. This sluggish movement, especially as the ink drains off the probe, may cause inaccurate level readings, as the ink between the two probes may be of a higher level than the ink in the reservoir. Any suitable means or method, however, may be used to attach the outer probe to the probe support frame to provide the predetermined gap between the outer probe and the upper and lower probes. Molding the support frame around the upper and lower probes enables accurate and repeatable positioning of the probes relative to one another and to the frame.

Figure 15:
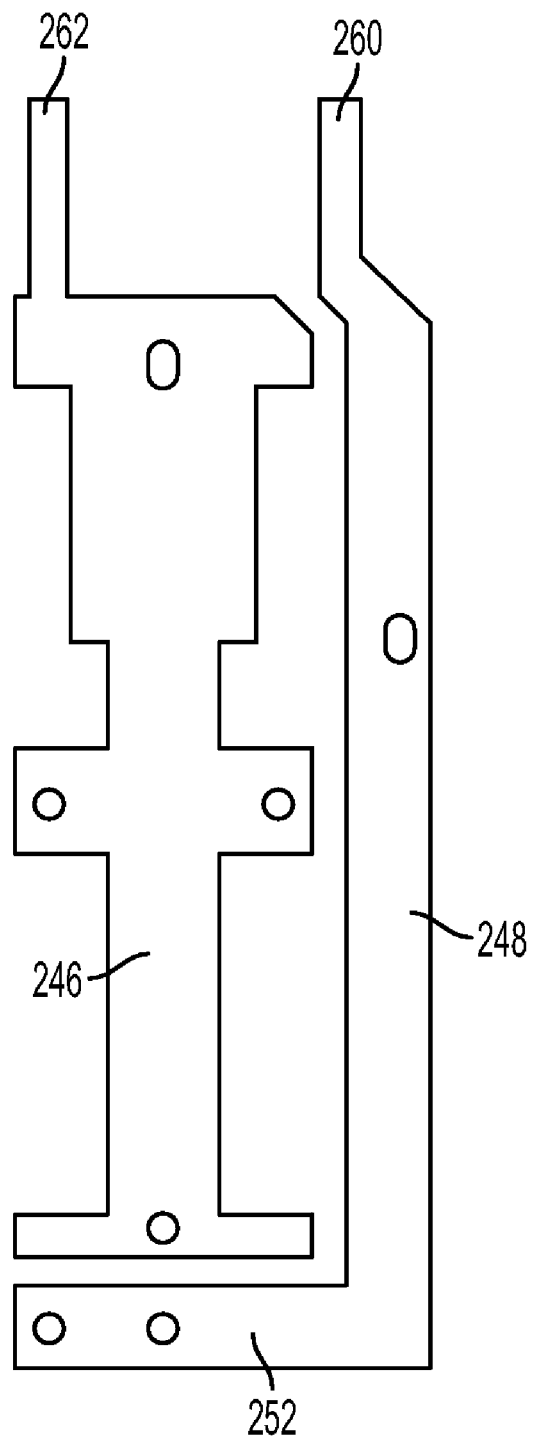
FIG. 15 is a front elevational view of the upper and lower probes of the level sensor of FIG. 12.

FIG. 15 best shows the spatial relationship of the lower probe 248 and upper probe 246 with respect to each other in the support frame (not shown in FIG. 5). As seen in FIG. 15, the lower probe 248 includes a lower portion 252 that is configured to extend to the bottom portion of the level sensor 200 below the upper probe 248 so that the lower portion 252 of the lower probe is positioned at or near the bottom of an ink reservoir when the level sensor is inserted into the reservoir. The upper probe 246 is positioned above the portion 252 of the lower probe 248 and extends to an upper portion of the probe support. As seen in FIGS. 12-14, the outer probe 250 is positioned on the probe support 254 so that it extends substantially from the bottom to the top of the probe support frame 254 alongside both the lower probe 248 and the upper probe 246.

Each of the upper 246, lower 248, and outer probes 250 of each ink level sensor 200 is operably connected to an ink level controller 204. The ink level controller 204 may be implemented in the circuit board 210, or alternatively, may be in communication with the circuit board 210 via a suitable connection device such as a pin connector (not shown). Each of the upper 246, lower 248, and outer probes 250 includes a connection point, or tab, that extends upward through the top portion of the insulating support assembly for connection to the signal transmitting/receiving member. For example, the outer probe includes tab 256, lower probe includes tab 260, and upper probe includes tab 262 that each extends upward through the top portion of the probe support. The tabs of the probes of the level sensors are operably coupled to the circuit board via a suitable signal transmitting/receiving member. The signal transmitting/receiving members may comprise any suitable device or method that enables signal transmission between the probes of the level sensors and the ink level controller.

As depicted in FIGS. 4, 5, and 8-10, the signal transmitting/receiving members 214 comprise flexible circuit members, referred to herein as flex tape, that include probe traces that extend between and electrically connects the circuit board 210 and the respective tabs of the probes of the level sensors. In the embodiment of FIGS. 8-11 in which two level sensors 200 are supported in adjacent reservoirs by a single support member 208, a single flex tape 214 may be utilized to route the input and output signals between the two level sensors 200 and the circuit board 210. The flex tape 214 includes connection points 218 for electrically connecting the probe traces of the flex tape to the appropriate probe tabs. The probe tabs may be connected to the connection points on the flex tape in any suitable manner, such as by soldering. The probe traces include input signal traces 220 that extend between the tabs 256 of the outer probes 250 of the level sensors and the circuit board 210 and output signal traces 224 extending between the tabs 260, 262 of the upper and lower probes of the level sensors and the circuit board 210. The flex tape 214 includes ground traces 228 between the input signal traces and the output signal traces. The ground traces shunt any leakage currents on the flex tape 214 directly to ground such that no leakage current flows from an outer probe trace to an upper or lower probe trace.

To detect the level of ink in an ink reservoir, an AC signal 230 is driven, or input to the tab 256 of the outer probe 250. The ink 290 conducts the AC signal to the lower probe 248 and to the upper probe 246. Controller 204 shown in FIG. 16 detects a current flow from the outer probe 250 through the ink 290 to the lower probe 248. Controller 204 also detects a current flow from the outer probe 250 through the ink 290 to the upper probe 246. Assuming that the ink temperature and conductivity remains relatively consistent, a substantially constant current flow is detected via the lower probe 248. Varying levels of current flow are detected via the upper probe 246 as more or less of the upper probe's surface area is covered or uncovered in ink. The controller 204 is configured to compare the varying current flow in the upper probe 246 to the constant current flow of the lower probe 248 resulting in a continuous measurement of the height of ink in the ink reservoir.

Figure 16:
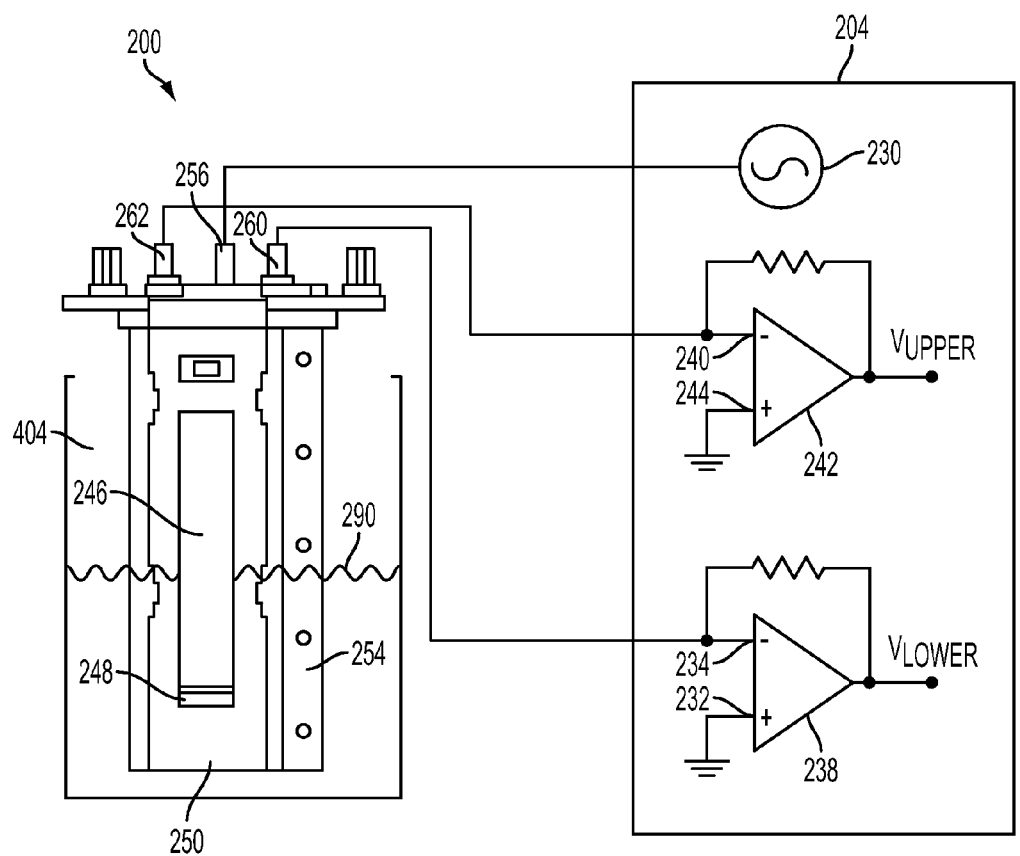
FIG. 16 is a simplified schematic and circuit diagram of an ink level sensor and ink level controller.

As depicted in FIG. 16, the lower probe 248 is electrically connected to the negative input 234 of op/amp 238 in controller 204. This negative input 234 forms a virtual ground by connecting the positive input 232 of op/amp 234 to ground and also connecting the negative input 234 of op/amp 238 through a resistor to the output of op/amp 238. This virtual ground circuit eliminates any stray currents that can arise to conductivity from the probes and associated traces and wires to electrical ground (i.e., reservoir body and other metal structures). Responsive to the current flow from the outer probe 250 through the ink 290 to lower probe 248, op/amp 238 outputs a voltage $V_{lower}$ that is an expression of a conductance of the ink 290 in the reservoir 404. The conductance is measured for substantially any level of ink 290 in the reservoir 404 because the lower probe 248 is positioned near the bottom of the reservoir 404.

The upper probe 246 is electrically connected to the negative input 240 of op/amp 242 in controller 204. This negative input 240 forms a virtual ground by connecting the positive input 244 of op/amp 242 to ground and also connecting the negative input 240 of op/amp 242 through a resistor to the output of the op/amp 242. This virtual ground circuit eliminates any stray currents that can arise due to conductivity from the probes and associated traces and wires to electrical ground (i.e., reservoir body and other metal structures). Responsive to the current flow from the outer probe 250 through the ink 290 to upper probe 246, op/amp 242 outputs a voltage $V_{upper}$ that is an expression of a conductance of the ink 290 contacting the surface area of the upper probe 246. As the level of the ink 290 varies in reservoir 40, that amount of surface area of upper probe 246 immersed in the ink 290 varies resulting in a varying conductance.

The controller 204 compares the variable $V_{upper}$ with the base value of $V_{lower}$. The comparison can be accomplished by connecting the outputs of the virtually grounding op/amps 242, 238 to the inputs of another op/amp (not shown) which itself would output the ratio of the voltage outputs of the op/amps 242, 238. Any other methods of comparing voltages commonly known in the art are contemplated to be within the scope of this disclosure. This comparison gives a continuous measurement of the level of ink 290 in reservoir 404. The conductance of ink varies over types of inks and even within the same type of ink at different temperatures. The two probes 246, 248 result in a comparison of two voltages outputted by virtually grounding op/amps. Thus, no matter what type of ink or what temperature the ink, a comparison of conductance is measured.

Figure 17:
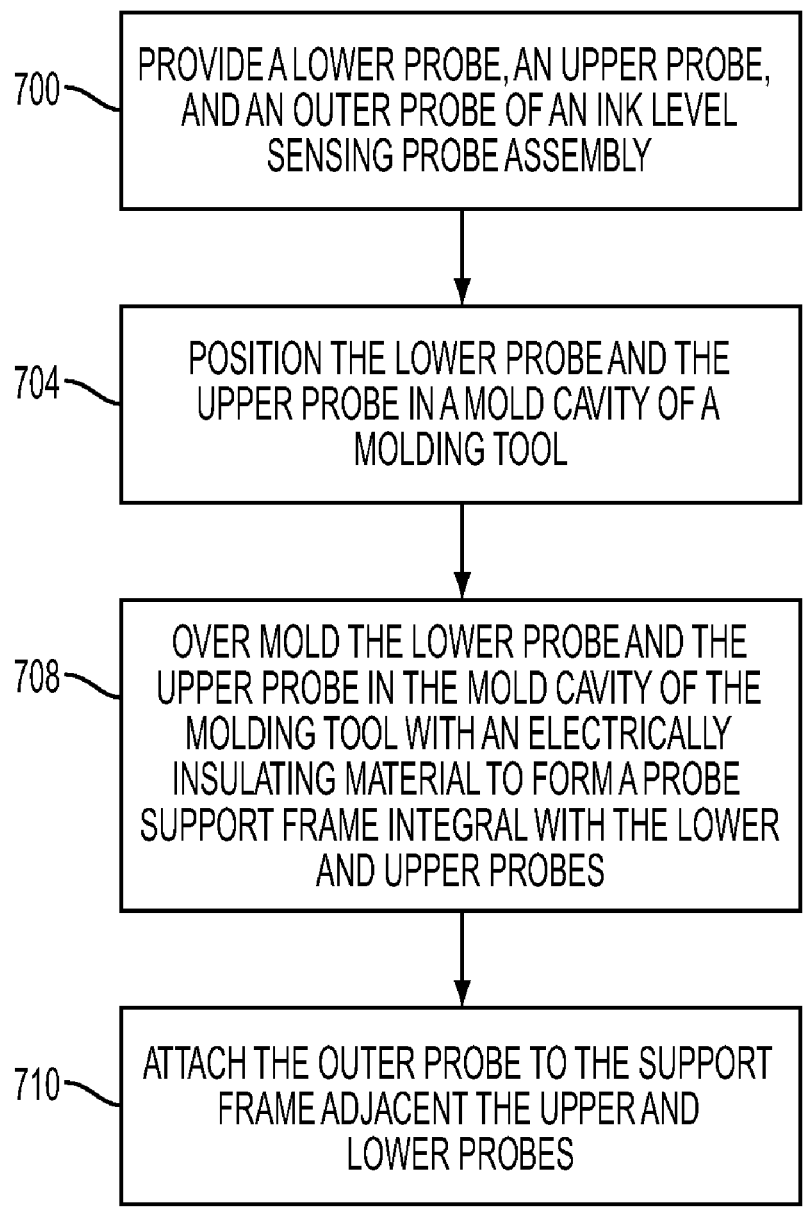
FIG. 17 is a flow chart showing a method of manufacturing and assembling the probe assembly of FIG. 12.

As mentioned above, the level sensors describe above have a simplified construction that involves over molding the upper and lower probes into the insulating support frame and assembling the outer probe onto the support frame so formed. Referring now to FIG. 17, there is shown a flow chart of an embodiment of a manufacturing/assembly process for a probe assembly such as the one described above. According to the exemplary process, the lower, upper, and outer probes are first formed using any suitable device or method as is know in the art capable of producing electrically conductive probes (block 700). In one embodiment, the probes are formed of a substantially flat metallic material such as stainless steel, nickel, copper, silver, etc. Any suitable material and/or method may be used to form the upper, lower and outer probes. In addition, the probes may have any size, shape, thickness, etc. suitable for their intended purposes.

Once the probes have been formed, the upper and lower probes are inserted into a suitable shaped molding tool (block 704). The molding tool includes appropriate structures as are known in the art for holding the upper and lower probes in precise positions with respect to each other inside the mold cavity of the molding tool. The mold cavity of the molding tool is shaped to correspond to the desired final shape of the support frame including the upper and lower probe assemblies. In addition, the mold cavity may include shaped spaces or voids at predetermined positions within the cavity that enable the formation of attachment features such as the board connect studs and board connect standoffs described above as well as features that will enable the assembly of the outer probe to the support frame after the frame is completed as well. In one embodiment, the outer probe assembly may be attached to the support frame of the probe assembly by a press or snap fit although any suitable attachment method may be used.

Once the upper and lower probes are placed in proper configuration in the molding tool, the cavity of the molding tool defining the probe support frame for the probe assembly is filled with a suitable non-conductive material such that portions of the upper and lower probes are over molded in the molding tool thereby becoming integral with the resulting support frame (block 708). The material used to form the over molded support frame may be any suitable electrically insulating material such as plastic. In one embodiment, the over molded support frame may be formed by injection molding. In this embodiment, the insulating material used for the support frame is heated to a liquid or malleable state and injected into the molding tool substantially filling the mold cavity including any shaped spaces or voids that define attachment features. The insulating material injected into the molding tool is then allowed to cool and harden. Thereafter, the completed support frame assembly including the upper and lower probes may be removed from the molding tool (block 710).

Once the finished support frame assembly including the over molded upper and lower probes is completed, the outer probe may be attached to the support frame in any suitable manner depending on the desired method of attachment incorporated into the support frame. For example, the support frame of FIGS. 3-5 includes standoffs and opposing tabs that enable the outer probe to be attached to the support frame without adhesives or other attachment features. Any suitable method of attaching the outer probe to the support frame, however, may be utilized.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A probe assembly for use with an ink reservoir level sensing apparatus, the probe assembly comprising:
    an insulating support frame formed of an electrically insulating material, the insulating support frame having a lower portion to be positioned in a lower portion of an ink reservoir and an upper portion configured to be positioned in an upper portion of the ink reservoir, the insulating support frame including a lower probe and an upper probe, the lower probe and the upper probe being partially encapsulated by the electrically insulating material of the insulating support frame to physically and electrically isolate the lower probe from the upper probe, and a first portion of the insulating support frame being molded about a portion of the upper probe to position the portion of the upper probe within the insulating support frame and a second portion of the insulating support frame being molded about a portion of the lower probe to position the portion of the lower probe within the insulating support frame; and
    an outer probe attached to the insulating support frame using attachment features that are formed integrally with the insulating support frame, the outer probe being positioned on the insulating support frame extending from the lower portion of the insulating support frame to the upper portion of the insulating support frame.

2. The probe assembly of claim 1, the attachment features integrally formed with the insulating support frame including:
    at least two standoffs and at least two opposing tabs configured to enable attachment of the outer probe to the insulating support frame.

3. The probe assembly of claim 1, each of the lower and the upper probes include tabs that extend through the upper portion of the insulating support frame and are configured for connection to electrical contacts on a circuit board that supports the insulating support frame and the outer probe attached to the insulating support frame in the ink reservoir, the tabs electrically connecting the lower and the upper probes to an ink level sensing controller.

4. The probe assembly of claim 3, the insulating support frame including board connect studs configured to connect the probe assembly to the circuit board.

5. The probe assembly of claim 3, the outer probe further comprising:
    a tab extending from the outer probe, the tab being configured for connection to electrical contacts on the circuit board and to receive an AC signal from the ink level sensing controller, the upper and lower probes being configured to receive the AC signal from the outer probe via ink in the ink reservoir.

6. An ink reservoir level sensing system comprising:
    at least one probe assembly configured to be inserted into an ink reservoir of an imaging device, the at least one probe assembly including:
        an insulating support frame formed of an electrically insulating material, the insulating support frame having a lower portion to be positioned in a lower portion of an ink reservoir and an upper portion configured to be positioned in an upper portion of the ink reservoir, the insulating support frame including a lower probe and an upper probe, the lower probe and the upper probe being partially encapsulated by the electrically insulating material of the insulating support frame to physically and electrically isolate the lower probe from the upper probe, and a first portion of the insulating support frame being molded about a portion of the upper probe to position the portion of the upper probe within the insulating support frame and a second portion of the insulating support frame being molded about a portion of the lower probe to position the portion of the lower probe within the insulating support frame; and
        an outer probe attached to the insulating support frame using attachment features that are formed integrally with the insulating support frame, the outer probe being positioned on the insulating support frame extending from the lower portion of the insulating support frame to the upper portion of the insulating support frame; and
    a controller electrically connected to the outer probe and configured to drive an AC signal to the outer probe and to detect a current flow from the outer probe to the upper and lower probes via ink in the reservoir.

7. The system of claim 6, further comprising:
    an electrical circuit connecting the controller to the upper and lower probes, in which the electrical circuit forms a virtual ground.

8. The system of claim 7, wherein the electrical circuit includes a first op-amp configured to act as a virtual ground electrically connected to the lower probe and a second op-amp configured to act as a virtual ground electrically connected to the upper probe.

9. The system of claim 6, the at least one probe assembly including four probe assemblies, each probe assembly being configured for insertion into a separate ink reservoir in the imaging device, the controller being configured to drive an AC signal to the outer probe in each ink reservoir and to detect a current flow from the outer probe to the upper and lower probes in each ink reservoir.

10. The system of claim 9 further comprising:
a circuit board configured to support the four probe assemblies and to electrically connect the upper, lower and outer probes of each probe assembly to the controller.

11. The system of claim 10, the lower and the upper-probes of each probe assembly including:
tabs extending through an upper portion of the insulating support frame in which the lower and upper probes are partially encapsulated, the tabs being configured to connect the lower and upper probes to solder points on the circuit board.

12. The system of claim 11, the insulating support frame of each probe assembly including:
board connect studs configured to connect the probe assembly from which the board connect studs extend to the circuit board.

13. The system of claim 6, the insulating support frame of each probe assembly including:
snap fit attachment features configured to attach the outer probe to the insulating support frame in which the snap fit attachment features are formed.

14. A system for use with an imaging device comprising:
at least one ink reservoir configured to hold a supply of ink;
a probe assembly configured to be inserted into the at least one ink reservoir, the probe assembly including:
an insulating support frame formed of an electrically insulating material, the insulating support frame having a lower portion to be positioned in a lower portion of an ink reservoir and an upper portion configured to be positioned in an upper portion of the ink reservoir, the insulating support frame including a lower probe and an upper probe, the lower probe and the upper probe being partially encapsulated by the electrically insulating material of the insulating support frame to enable the lower probe to be physically and electrically isolated from the upper probe, and a first portion of the insulating support frame being molded about a portion of the upper probe to position the portion of the upper probe within the insulating support frame and a second portion of the insulating support frame being molded about a portion of the lower probe to position the portion of the lower probe within the insulating support frame; and
an outer probe attached to the insulating support frame using attachment features that are formed integrally with the insulating support frame, the outer probe being positioned on the insulating support frame extending from the lower portion of the insulating support frame to the upper portion of the insulating support frame; and
a controller configured to drive an AC signal to the outer probe and to detect a current flow from the outer probe to the upper and lower probes via ink in the reservoir.

15. The system of claim 14, further comprising:
an electrical circuit connecting the controller to the upper and lower probes, in which the electrical circuit forms a virtual ground.

16. The system of claim 15, wherein the electrical circuit includes a first op-amp configured to act as a virtual ground electrically connected to the lower probe and a second op-amp configured to act as a virtual ground electrically connected to the upper probe.

17. The system of claim 16, the at least one ink reservoir including four ink reservoirs, and the probe assembly including four probe assemblies, each probe assembly being configured for insertion into one of the ink reservoirs, the controller being configured to drive an AC signal to the outer probe in each ink reservoir and to detect a current flow from the outer probe to the upper and lower probes in each ink reservoir.

18. The system of claim 17 further comprising:
a circuit board configured to support the four probe assemblies and to electrically connect the upper, lower and outer probes of each probe assembly to the controller.

19. The system of claim 18, the lower and the upper probes of each probe assembly including:
tabs extending from an upper portion of the insulating support frame from which the tabs extend, tabs being configured to connect the upper and lower probes to solder points on the circuit board.

20. The system of claim 19, the insulating support frame of each probe assembly including:
board connect studs configured to connect the probe assembly in which the board connect studs are formed to the circuit board.

* * * * *